United States Patent

Eissmann

[15] 3,684,948
[45] Aug. 15, 1972

[54] POTENTIAL DEVICE WITH INPUT REACTANCE ADJUSTMENT

[72] Inventor: Kurt William Eissmann, Dalton, Mass.

[73] Assignee: General Electric Company

[22] Filed: Feb. 8, 1971

[21] Appl. No.: 113,670

Related U.S. Application Data

[63] Continuation of Ser. No. 833,076, June 13, 1969, abandoned.

[52] U.S. Cl. ................ 323/43.5 R, 323/48, 323/61
[51] Int. Cl. .............................................. G05f 3/04
[58] Field of Search ....317/12 B; 323/43.5 R, 47, 48, 323/60, 61

[56] References Cited

UNITED STATES PATENTS

3,059,172   10/1962   Eissmann et al. ............. 323/61
1,870,851   8/1932    Jones ........................... 323/60
2,310,097   2/1943    Langguth et al. ......... 323/61 X Primary Examiner—A. D. Pellinen

[57] ABSTRACT

A bushing potential device having a closely coupled tertiary winding and adjustable phase angle capacitor connected in series across a loosely coupled secondary winding is provided with adjustable and/or variable capacitors in parallel with the tertiary winding. In potential devices designed for application to very high voltage systems the necessarily low minimum value of equivalent reactance in the device reduces its available range of adjustability in the low reactance region. By adding adjustable capacitance in shunt with the tertiary winding the equivalent input reactance is rendered adjustable so that it can be brought within the available range of device reactance with a less severe reduction of device reactance.

6 Claims, 5 Drawing Figures

PATENTED AUG 15 1972 3,684,948
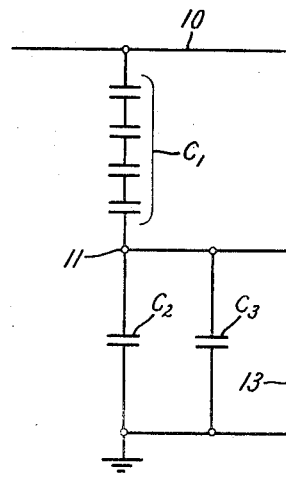
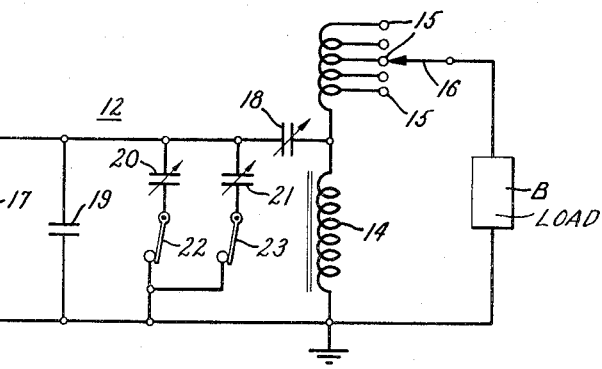
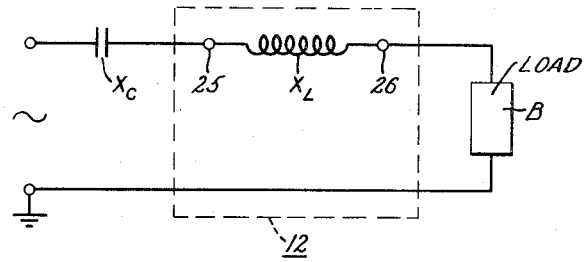
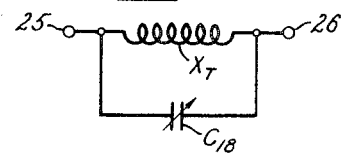
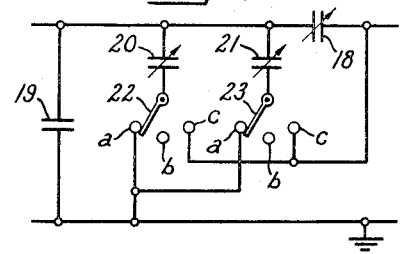
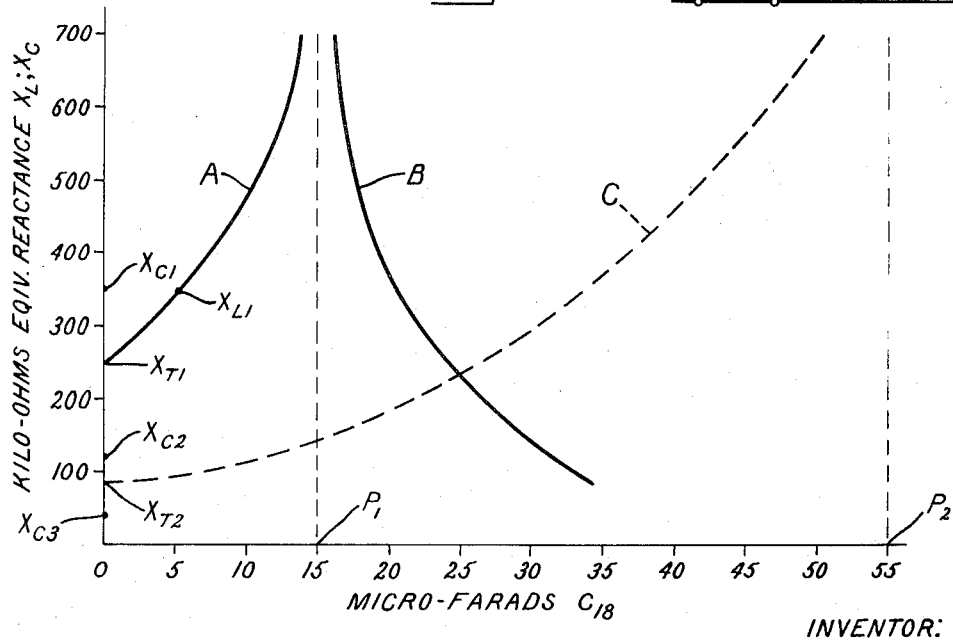
INVENTOR:
KURT W. EISSMANN
BY J. Wesley Haubner
ATTORNEY

POTENTIAL DEVICE WITH INPUT REACTANCE ADJUSTMENT

This application is a continuation of application Ser. No. 833,076, filed on June 13, 1969, which application has been abandoned in favor of the current application.

My invention relates to bushing potential devices, and more particularly to a potential device including improved means for obtaining a resonant match between the reactance of the potential device and its high voltage source.

In high voltage electric systems, it is often necessary to derive voltages proportional to system voltage but of much lower magnitude for supply to relays, instruments and other small loads. It is customary to derive such a proportional voltage of low magnitude from a capacitive divider, or potentiometer, built into a high voltage terminal bushing. A selected low voltage tap on such a capacitive divider usually provides a voltage somewhat different in phase and magnitude from the desired utilization voltage. It is therefore necessary to interpose a potential transformer of relatively low ratio (i.e., of the order of 100:1 or less) between the load and the capacitor tap. Such a potential transformer has come to be known as a potential device, and ordinarily it provides selectable output voltages through secondary winding taps.

It is known that phase coincidence between line voltage and the output voltage of a potential device may be attained and voltage regulation of the device minimized by so adjusting equivalent inductive (.e., leakage) reactance of the device (herein referred to as $X_L$), that it is equal to the capacitive reactance of the capacitive voltage divider from which its input voltage is supplied. In the equivalent transformer circuit for the potential device such matching of reactance results in series resonance, so that the net equivalent impedance is resistive only. The means for adjustment of reactance should itself be adjustable, so that the reactance match for series resonance may be maintained even though the transformer winding reactance itself (herein called $X_T$) is varied by tap changing at the output terminals of the device. The use of a reactance control which is adjustable has the further advantage that the potential device is thereby made compatible with voltage dividers having different capacitive values.

Numerous arrangements have been employed by the prior art for accomplishing reactance matching by adjustment of net inductive reactance of a potential device. For example, in U.S. Pat. No. 2,440,540 to J.W. Farr assigned to the present assignee, the reactance of the potential transformer is adjusted by employing a large number of taps and switches. In U.S. Pat. No. 2,930,964 to R.F. Goodman, also assigned to the present assignee, there is disclosed a potential device in which split secondary windings are loosely and closely coupled and associated with a tertiary winding and a variety of selectable tap connections. In a third arrangement illustrated in U.S. Pat. No. 3,059,172 to K.W. Eissmann et al., assigned to the present assignee, a loosely coupled transformer secondary winding has connected across a portion thereof a closely coupled tertiary winding in series with adjustable reactance means including a capacitor.

While the foregoing means for reactance matching in potential devices have proven effective for system voltages heretofore commonly used, i.e., of the order of 115 to 345 kv, it has been found difficult to adjust device reactance for suitable matching with potential dividers designed for the considerably higher system voltages now coming into use. For example, in terminal bushings designed for voltages of the order of 500 to 1,500 kv, it is necessary to provide a substantial amount of auxiliary capacitance between a low voltage capacitance tap and ground in order to keep the tap voltage within desired low limits. Such additional capacitance results in a very low equivalent capacitive reactance ($X_C$) for the bushing. It has been found that when the equivalent inductive reactance of the potential device is made commensurately small to maintain the desired reactance match and series resonance, and adjustability in the low reactance region is provided through a phase angle capacitor as in the Eissmann et al. patent above, variation of the phase angle capacitor has less effect upon the equivalent reactance of the potential device than it does when the minimum reactance of the device is higher. That is, when the minimum inductive reactance (i.e., transformer reactance $X_T$) of a potential device having a phase angle control capacitor is initially set at a very low point and adjustment provided in a low reactance region, the rate of change of device reactance as phase angle capacitance is increased becomes so small that very little range of adjustment, or "turn-up," is obtainable.

Accordingly it is a principal object of my invention to provide an improved transformer circuit for potential devices of a design especially adapted for use on electric systems of very high voltage, i.e., of the order of 500 kv and upward.

It is another object of my invention to provide a transformer type potential device having reactance adjustment means adapted for matching with capacitive source potentiometers of unusually low reactance.

It is a more specific object of my invention to provide a bushing potential device having means for adjusting the equivalent capacitive reactance of an input potentiometer as well as means for adjusting the equivalent inductive reactance of the device, thereby to facilitate resonant matching without excessive limitation of the range of adjustability, i.e., "turn-up" of device reactance.

I have discovered that a potential device of the phase angle capacitor type having a low minimum equivalent reactance (i.e., low transformer reactance $X_T$) and thus an inherently low range of adjustability in the low reactance region, may be more readily matched, or tuned, to the available input reactance by providing the device with additional adjustable capacitance connected to increase the equivalent input reactance. In this manner the minimum device reactance may be maintained at a higher level and its range of adjustability restricted less than otherwise would be necessary.

In carrying out my invention in one preferred embodiment I provide a potential device comprising a low ratio potential transformer having a loosely coupled secondary winding and a closely coupled tertiary winding of substantially equal numbers of turns. The secondary and tertiary windings are connected in parallel circuit relation through an adjustable phase angle capacitor and additional adjustable and/or variable capacitor means is connected in parallel circuit relation with the tertiary winding itself. Adjustment of this latter capacitive means has the effect of varying the equivalent capacitive reactance of the input potentiometer whereby a desired minimum inductive reactance of the potential device may be maintained so that the device is characterized by an appreciable rate of change of inductive reactance with change in the phase angle capacitor.

Other objects and advantages of my invention will become apparent by referring now to the following detailed specification taken in conjunction with the accompanying drawing in which:

FIG. 1 is a schematic circuit diagram of a transformer potential device embodying my invention and connected between a capacitive input potentiometer and a load device or burden;

FIGS. 2 and 2a are schematic representations of the equivalent circuit for the supply source, transformer and load shown at FIG. 1.

FIG. 3 is a typical graphical representation showing relationship between potential device reactance and the magnitude of an adjustable phase angle capacitance, and FIG. 4 is a fragmentary circuit diagram showing a modification of the switching portion of the circuit of FIG. 1 to illustrate another embodiment of my invention.

Referring now to the drawing and particularly to FIG. 1, I have shown a high voltage conductor 10 which may be one phase of a polyphase alternating current high voltage transmission line. The conductor 10 is shown connected to ground through a plurality of capacitors $C_1$, $C_2$ which may, for example, be integrally built into a high voltage terminal bushing connected to the line 10. Such a bushing may appropriately have the structure of that shown in U.S. Pat. No. 3,101,386 to Cronin et al. assigned to the present assignee, the series capacitors shown at FIG. 1 being constituted by the tubular concentric voltage equalizing conductors interwound in the core insulation of the bushing. The capacitors $C_1$ and $C_2$ constitute a capacitive voltage divider, or potentiometer, in which the terminal 11 constitutes a relatively low voltage point. Between the low voltage terminal 11 and ground I have shown also a capacitor $C_3$ connected in parallel circuit relation with the capacitor $C_2$ and representing auxiliary or loading capacitance necessary to maintain the terminal 11 within a desired low voltage range when the alternating current line 10 is at extremely high voltage.

Connected between the capacitive potentiometer terminal 11 and ground I have shown a transformer potential device designated generally by the reference numeral 12, and comprising a primary winding 13 loosely inductively coupled to a secondary winding 14, the winding 13 having a low turns ratio relative to the winding 14 (i.e., of the order of 100:1 or less) and providing at one end thereof a plurality of output voltage taps 15. A suitable load device, or burden, B is shown connected across the transformer secondary winding 14 through a movable tap contact 16.

The bushing potential device 12 includes also a tertiary winding 17 closely coupled (i.e., with small leakage reactance) to the primary winding 13 and having substantially the same number of turns as the main untapped portion of the loosely coupled secondary winding 14. The tertiary winding 17 is connected across, or in shunt circuit relation with, the untapped portion of the transformer winding 14 through an adjustable series capacitor 18, the purpose of which will be more fully described hereinafter. It should now be noted however that, since the closely coupled tertiary winding 17 has a substantially negligible inductive reactance in relation to the high reactance of the loosely coupled secondary winding 14, the major element of reactance connected across the untapped portion of winding 14 through the series circuit 17, 18 is constituted by the capacitor 18. In this shunt circuit I provide also across the terminals of the closely coupled tertiary winding 17 an adjustable and/or variable capacitive reactance shown as a plurality of parallel capacitors 19, 20, 21. For the purpose of illustration, the capacitor 19 is shown fixedly connected across the tertiary winding 17, and the capacitors 20 and 21 are shown as variable capacitors selectably connectable in parallel with capacitor 19 and winding 17 through manual switches 22 and 23, respectively The mode of operation of my improved potential device illustrated at FIG. 1 will be better understood by referring now to the equivalent circuit of the device as shown at FIGS. 2 and 2a. In this circuit the input voltage between the potentiometer terminal 11 and ground is shown applied to a transformer "equivalent" circuit well known to those skilled in the art and comprising a capacitive reactance $X_C$ connected in series circuit relation with an inductive reactance $X_L$ and the load device B. The capacitive reactance $X_C$ is the equivalent reactance of the capacitive potentiometer $C_1$–$C_2$ and auxiliary capacitors $C_3$. The inductive reactance $X_L$ shown connected between terminals 25 and 26 represents the equivalent reactance of the potential device, and the burden, or load, B is the same as that illustrated at FIG. 1. At FIG. 2a I have shown more in detail that the total equivalent reactance $C_L$ of the potential device is constituted by the equivalent inductive reactance $X_T$ of the potential transformer windings and the phase angle capacitor 18 connected in shunt circuit relation therewith. As pointed out above, the reactance of the tertiary winding 17 (connected in series in this capacitive shunt circuit at FIG. 1) is relatively negligible.

It will now be evident to those skilled in the art that the equivalent reactance $X_L$ of the potential device may be represented by the equation:

$$X_L = \frac{X_T}{1 - \dfrac{X_T}{\dfrac{1}{\omega C_{18}}}}$$

where $\omega = 2\pi f$ and $f$ = system frequency.

It will be evident from the foregoing relationship that when $C_{18}$, the capacitance of the capacitor 18, is zero, $X_L$ is equal to $X_T$. As $C_{18}$ is increased, $X_L$ increases exponentially toward a maximum at the point where $X_T$ equals $1/\omega C_{18}$. The equality of the inductive reactance $X_T$ and the parallel-connected capacitive reactance $1/\omega C_{18}$ defines a condition of parallel resonance between the equivalent inductive reactance of the potential device and the parallel connected phase angle capacitor 18. In this condition of parallel resonance the equivalent reactance $X_L$ is a maximum, limited only by whatever resistance is inherent in the transformer circuit. As $C_{18}$ is further increased, the equivalent reactance $X_L$ diminishes exponentially and becomes capacitive in its net effect.

The foregoing described relationship between the magnitude of the phase angle capacitor $C_{18}$ and the magnitude of the potential device equivalent reactance $X_L$ is shown at curves A and B of FIG. 3. It will be evident to those skilled in the art that at a value $P_1$ of the capacitor $C_{18}$ parallel resonance occurs in the equivalent circuit illustrate at FIG. 2a. The curve A, representing the inductive region of equivalent reactance $X_L$, is the useful range of adjustment within which potential device reactance may be brought into equality with the capacitive reactance of the input voltage divider. The minimum value of equivalent device reactance is represented at the point $X_{T1}$ and from this point the curve A is shown as demonstrating appreciable slope as the capacitance of capacitor $C_{18}$ is increased. In the usual case the minimum value $X_{T1}$ of equivalent reactance $X_L$ is set slightly below the equivalent capacitive reactance of the input potentiometer which may, for example, be at a point $X_{C1}$ on the ordinate scale. As described in my earlier U.S. Pat. No. 3,059,172, it is customary to adjust the device reactance $X_L$ to equal the input reactance $X_{C1}$ by increasing capacitance of capacitor 18 until the device reactance is brought to a point $X_{L1}$ on curve A. It is this action of increasing the capacitance of $C_{18}$ which is referred to hereinbefore as "turn-up" of the device reactance.

As pointed out heretofore, adjustment of potential device reactance in the foregoing manner is relatively ineffective if the equivalent reactance of the input potentiometer is so low that the minimum reactance of the potential device must be substantially reduced. For example, at curve C of FIG. 3 I have shown the manner in which device reactance $X_L$ varies with the capacitance of capacitor $C_{18}$ in the case where the minimum value $X_{T2}$ of device reactance is approximately one-third the minimum valve of curve A. It can be demonstrating that in this case the amount of capacitance $C_{18}$ which must be inserted to bring the equivalent circuit at FIG. 2a to a condition of parallel resonance is approximately three times the value $P_1$. This larger value of capacitance is indicated at FIG. 3 as a value $P_2$. Since the maximum value of curve C is approximately the same as that of the curve A, it will be evident that its slope, and particularly its slope for low values of capacitance, is severely reduced. Thus the lower it is necessary to set the minimum device reactance $X_{T2}$ to approximate input reactance, the more restricted is the available range of adjustment of device reactance in the low reactance range available for adjustment.

It is desirable therefore that improved means be provided for matching the equivalent reactance of the potential device with the equivalent reactance of the input potentiometer in a way which limits the necessary reduction of the minimum device reactance. This I accomplish by means of the parallel capacitors 19, 20 and 21 shown at FIG. 1 as connected in parallel circuit relation with the tertiary winding 17. These capacitors permit upward adjustment of equivalent input reactance to bring it within a predetermined range of adjustment of device reactance at a somewhat higher level than otherwise possible.

In very high voltage designs of the capacitive divider shown at FIG. 1, the auxiliary capacitor $C_3$ is of the order of 5 to 10 times the capacitance of the bushing capacitor $C_2$ and the capacitive input reactance $X_C$ will be low, as at a point between $X_{C2}$ and $X_{C3}$ at FIG. 3. It will be evident, of course, that to the extent the capacitance of capacitor $C_3$ can be reduced, the input reactance can be increased. In the usual practical circuit the capacitor tap 11 is at a voltage of the order of 5,000 to o 10,000 volts, so that it is not feasible to switch capacitance in parallel with the transformer primary winding 13. The same result is accomplished however by providing a variable amount of capacitive reactance in parallel with the transformer tertiary winding 17. It is for this purpose that I connect the adjustable variable capacitors 19, 20 and 21 in the manner shown at FIG. 1. It will now be evident to those skilled in the art that by reducing the total amount of capacitance connected in shunt circuit relation with the tertiary winding 17, I can effectively reduce the auxiliary capacitance $C_3$ and thereby increase the value of the equivalent input reactance $X_C$. By providing such upward adjustment of equivalent input reactance I am able to design the device reactance to a higher value than otherwise (with a consequent higher range of "turn-up") and to adjust the input reactance to fall within that range. For example, input reactance of $X_{C3}$ may be increased to $X_{C2}$ thus brought slightly above $X_{T2}$ so that matching may be accomplished without further reduction of $X_{T2}$.

In potential devices embodying my invention and including selectable capacitors such as 20 and 21 shown at FIG. 1 it is possible to extend the range of application of the device by providing switch means for connecting these capacitors across the series capacitor 18 when they are not required in shunt with the tertiary winding 17. This may be accomplished, for example, as shown in FIG. 4 where the manual switches 22 and 23 in the circuit of FIG. 1 are shown as multiposition switches having positions a, b and c. The position b is an open circuit position. In position a the capacitors 20 and 21 are connected as at FIG. 1. In position c the capacitors 20 and 21 are connected in parallel with capacitor 18.

With the alternative connection shown at FIG. 4, the potential device is characterized by two regions of adjustability; i.e., (1) a lower reactance region where the capacitance of the input potentiometer is matched to the potential device in the manner described hereinbefore, and (2) an upper reactance region where the potential device is matched to the potentiometer using a wide range of variable capacitance in series with the winding 17.

While I have shown and described only a preferred embodiment of my invention by way of illustration, many modifications will occur to those skilled in the art. I therefore intend herein to cover all such modifications as fall within the true spirit and scope of my invention.

What I claim as new and desire to secure by Letters Patent of the U.S. is:

1. In combination with a high voltage capacitive voltage divider having high voltage terminals adapted for connection to a source of alternating current voltage of the order of 500 to 1,500 kilovolts in magnitude, said voltage divider including a pair of low voltage tap terminals and having a predetermined low capacitive reactance therebetween, a potential device adapted for connection between said low voltage tap terminals and an electrical load comprising, a high reactance transformer having a primary input winding for connection across said tap terminals, a tertiary winding closely coupled to said primary winding and a secondary winding loosely coupled to said primary winding, a variable capacitive impedance connected between one end of said tertiary winding and a point on said secondary winding to operate in shunt circuit relation with at least a portion of said secondary winding, said variable capacitive impedance being tunable toward resonance with respect to the equivalent inductive reactance of said transformer thereby to increase the equivalent inductive reactance of said potential device from a minimum value toward a maximum resonant value, an adjustable capacitive impedance connected across at least a portion of said tertiary winding, and means for selectably varying the magnitude of said adjustable capacitive impedance thereby to control the equivalent input capacitance between the tap terminals of said voltage divider, whereby the magnitude of said equivalent input capacitance may be set at a value greater than the minimum equivalent inductive reactance of said potential device and reactance matching is accomplished by increasing the equivalent inductive reactance of said potential device to a magnitude equal to the preset value of said equivalent input capacitance.

2. A potential device according to claim 1 wherein said tertiary winding has substantially the same number of turns as the shunted portion of said secondary winding.

3. A potential device according to claim 3 wherein said secondary winding includes an untapped portion operatively shunted by said first adjustable capacitive impedance, and an extended tap section providing selectable output voltage.

4. In combination with a high voltage capacitive voltage divider having high voltage terminals adapted for connection to a source of alternating current voltage of the order of 500 to 1,500 kilovolts in magnitude, said voltage divider including a pair of low voltage tap terminals and having a predetermined low capacitive reactance therebetween, a potential device adapted for connection between said low voltage tap terminals and an electrical load comprising, a high reactance transformer having a primary input winding for connection across said tap terminals, inductive means for supplying a voltage proportional to the voltage of said primary winding and a secondary winding loosely coupled to said primary winding, a variable capacitive impedance connected between said inductive means and a point on said secondary winding to operate in shunt circuit relation with at least a portion of said secondary winding, said variable capacitive impedance being tunable toward resonance with respect to the equivalent inductive reactance of said transformer thereby to increase the equivalent inductive reactance of said potential device from a minimum value toward a maximum resonant value, an adjustable capacitive impedance connected in series circuit relation in said shunt circuit, whereby the equivalent input capacitance between the tap terminals of said voltage divider may be preset by said adjustable capacitive impedance to a value greater than the minimum equivalent inductive reactance of said potential device.

5. In a potential device adapted to be connected between a capacitive potentiometer and an electric load, a transformer primary winding, a tertiary winding closely coupled to said primary winding, a transformer secondary winding loosely coupled to said primary winding and having at one end a plurality of taps constituting selectable voltage output terminals for connection to said load device, a major untapped portion of said secondary winding providing a predetermined relatively low voltage ratio with respect to said primary winding, means for varying the equivalent inductive reactance of said potential device within a predetermined range of magnitude including a variable tuning capacitor connected between said tertiary winding and said secondary winding to operate in shunt circuit relation with said major portion of said secondary winding, and adjustable means for presetting the equivalent capacitive reactance of said potentiometer to a desired value within said range of magnitude comprising said tertiary winding and adjustable capacitor means selectably connectable across said tertiary winding, said tertiary winding and said major portion of said secondary winding having substantially the same number of turns.

6. A potential device according to claim 5 wherein said tuning capacitor and said tertiary winding are connected in series circuit relation across said major portion of said secondary winding.

* * * * *

UNITED STATES PATENT OFFICE
CERTIFICATE OF CORRECTION

Patent No. 3,684,948                     Dated August 15, 1972

Inventor(s) Kurt W. Eissmann

It is certified that error appears in the above-identified patent and that said Letters Patent are hereby corrected as shown below:

Col. 4, line 39 - "$C_1$" should be - $X_1$ -

5, line 12 - "illustrate" should be - illustrated -

5, line 44 - "demonstrating" should be - demonstrated -

6, line 13 - Delete "o" before 10,000

Claim #3 should depend from Claim #2

Signed and sealed this 6th day of March 1973.

(SEAL)
Attest:

EDWARD M. FLETCHER, JR.
Attesting Officer

ROBERT GOTTSCHALK
Commissioner of Patents